Patented Nov. 27, 1928.

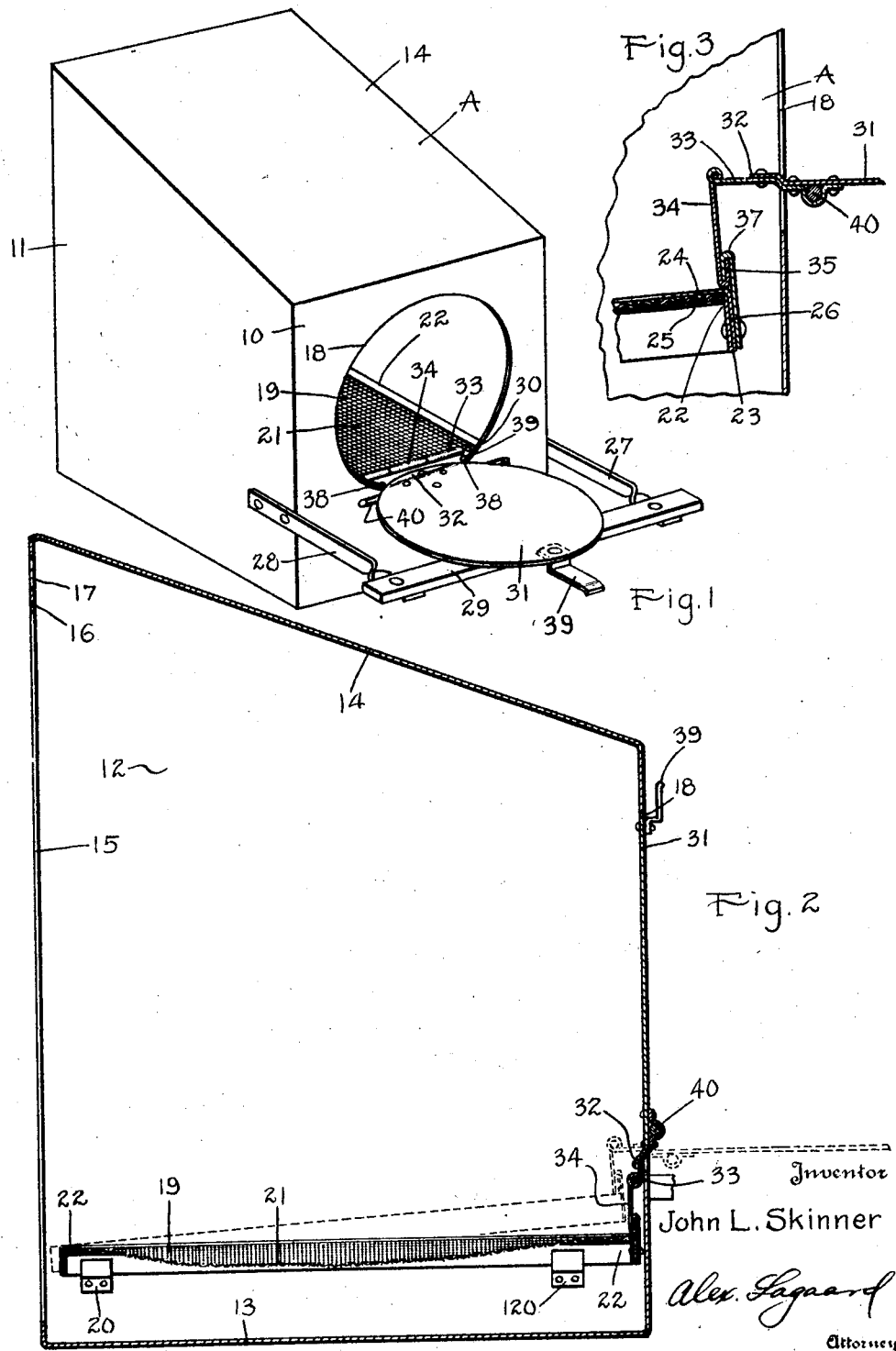

1,692,957

UNITED STATES PATENT OFFICE.

JOHN L. SKINNER, OF MINNEAPOLIS, MINNESOTA.

TRAP NEST.

Application filed February 17, 1927. Serial No. 168,927.

My invention relates to trap nests and has for its object to provide a simple and effective device for trapping laying hens within their nest to enable the poultry man to keep an accurate record of the eggs laid by the hens for the purpose of selecting good layers for breeding purposes.

An object of the invention resides in providing an enclosure having a wall formed with an entrance opening and a door for said opening normally extending outwardly therefrom in substantially horizontal position to provide an approach leading up to said opening, said door being swingably mounted relative to said opening to permit the same to move into closing position.

Another object of the invention resides in arranging said door with a portion thereof extending across the sill of said opening and inwardly into said enclosure, and in further providing said door with a stop adapted to act in conjunction with said inwardly extending portion thereof to swingably mount said door relative to said opening and to permit of closing the door upon the entrance of a hen into the nest, said door being readily disengaged from the sill of said opening to permit of the removal of the same from the nest.

A still further object of the invention resides in providing a movable bottom within said enclosure hingedly connected to said inwardly extending portion of said door by means of which said door may be swung into closing position upon downward movement of said bottom.

A feature of the invention resides in providing a rest extending outwardly beyond the closure for the purpose of supporting the outer end of said door, the inner end being supported upon the sill of the opening.

A still further object of the invention resides in providing a latch bar swingably mounted relative to said rest and adapted to engage the same and hold said door from movement relative to the opening.

In the drawings:

Fig. 1 is a perspective view of a trap nest illustrating my invention with the door in open position.

Fig. 2 is a longitudinal sectional view of the structure shown in Fig. 1 illustrating the door in closed position.

Fig. 3 is an enlarged sectional view of a portion of the structure shown in Fig. 2 and showing the door in open position.

In the use of trap nests for poultry purposes, it is highly desirable to have a structure which is simple in construction and in operation and which will effectively function to trap the hen upon the entry into the nest until released by an attendant. It is further highly desirable to have a device which may be used as an ordinary nest, if desired, but which may be readily used as a trap nest. A nest of this nature must further be readily taken apart for cleaning so that the hens and surroundings may at all times be kept in a sanitary condition. My invention accomplishes these results in a manner which will become presently apparent.

The invention proper consists of a box-like enclosure A preferably constructed of sheet metal and formed with a front wall 10 connected with side walls 11 and 12. A bottom 13 extends across the lower edges of said walls, while a roof 14 extends across the upper edges of the same leaving the rear of the enclosure open as indicated at 15. The marginal portions of the walls 11, 12, 13 and 14 may be turned inwardly to provide flanges 16, as shown in Fig. 2, which may be constructed with suitable slots 17 for the purpose of attaching the nest to the wall of the hen house in an elevated position above the floor. If desired, however, the back of the enclosure may be closed with a suitable back not illustrated in the drawings, or the nest supported in any desired manner, either individually or with a number of nests arranged side by side or in groups one above the other.

In the front wall 10 of the enclosure A is formed a circular opening 18 which provides an entrance to the nest. Within the interior of the nest is arranged a removable false bottom 19 which is disposed above the bottom 13 and is carried by a number of supports 20 and 120 attached to the walls 11 and 12. This false bottom is preferably constructed of a wire screen 21 arranged in a metallic frame 22 having a downwardly extending flange 23 for the purpose of giving the entire support sufficient rigidity. This frame may be constructed of sheet metal doubled back upon itself as indicated at 26 in Fig. 3 and arranged with the extreme ends 24 and 25 embracing the marginal portions of the screen 21. Upon this bottom is placed hay or straw or other suitable bedding for the hens so that when the nest is made up the interior construction of the false bottom is entirely concealed so as to give the appearance of the usual hen's nest.

Along the sides 10 and 11 of the enclosure

A are arranged two outwardly extending arms 27 and 28, which arms have riveted to them a rest 29 arranged substantially parallel to the front wall 10 of the enclosure and slightly below the lower portion 30 of the body of the wall 10 bounding the opening 18 which forms a sill to the entrance to the nest. In conjunction with the opening 18 I provide a door 31 which is of substantially the same configuration as the opening 18 and which may be constructed from the material removed in the formation of said entrance opening. This door is arranged to be normally supported at its outer end upon the rest 29 while the inner portion of said door indicated at 32 extends across the sill 30 and into the interior of the enclosure proper resting upon said sill. This portion of the door 31 has securely riveted to it a hinge leaf 33 which in turn is hingedly connected to a second hinge leaf 34 attached to the forward edge of the false bottom 19. If desired, the hinge leaf 34 may be removably attached to the bottom 19 as shown in Fig. 3. This is accompanied by bending the lowermost edge 35 thereof in the form of a hook which may be engaged with a similarly bent attaching member 37 riveted to the forward flange 23 of the frame 22. The leaf 34 in being applied to the device may be slid endwise to engage the two hook portions 37 and 35 so as to securely connect the said hinge portion to the false bottom. The hinge leaf 34 is of such a length that when the door 31 is in closed position as will be presently described, the false bottom 19 rests upon the rear support 20 while the same is slightly above the forward support 120.

The door 31 is swingably mounted relative to the opening 18 in the following manner. As noted in Fig. 1, the said door extends across the sill 30 and inwardly into the nest proper, thereby resting directly upon said sill at two points designated at 38 in the drawings. Adjacent these points the hinge leaf 33 is constructed with two notches 39 which in conjunction with the outwardly flaring edge of the door proper deprives the door of appreciable inward or outward movement. In close proximity to the point 38 on the door is attached a transversely disposed rod 40, which in conjunction with the notched portions 39 of the hinge leaf 33 serve to swingably support the door upon the sill and to prevent the movement of the door beyond its closed position. To facilitate the complete closure of the door the inwardly extending portion 32 together with the hinge leaf 33 are offset from the body of the door proper as can best be seen in Fig. 2, so that the same may lie parallel with the lowermost part of the wall 10 when the door is closed. The false bottom 19 is slightly shorter than the length of the nest so that the same may be moved rearwardly a sufficient amount to allow the swinging of the door from open to closing position. In Fig. 2, the door is shown as closed in full lines, while the relation of the bottom and the door when in open position is illustrated in dotted lines.

In using the device the entire false bottom 19, as previously stated, is covered with hay which may, if desired, extend sufficiently forwardly to cover hinge leaves 33 and 34. The hen upon desiring to enter the nest alights upon the outwardly extending door 31, which serves as an approach to the entrance formed by the opening 18. Upon the hen entering the nest her weight is immediately transferred to the false bottom 19 which moves downwardly and swings the door from its dotted position (Fig. 2) to its full line position in the same figure thereby trapping the hen within the nest. Inasmuch as the false bottom 19 covers the entire floor area of the nest, the hen must at all times remain lodged upon the same and the door kept closed. It will be noted that when the door is in closed position the same is substantially balanced so that but slight pressure is required to maintain the same closed. Sufficient pressure to so hold the door is had even when the hen moves to the rear of the nest where the leverage on the trap bottom is least.

On the extreme end of the door 31 which, when the door is in its closed position, forms the upper portion of the same, is pivoted an offset latch 39, which as illustrated in Fig. 1 serves as a handle for manipulating the door manually. This latch may be swung rearwardly to lodge the same beneath the rest 29 so as to hold the door in open position whenever it is desired to eliminate the trapping feature of the nest. When so arranged, the nest is used in the ordinary manner and does not require the assistance of an attendant for releasing the hens trapped within the same. If desired, the door 31 may be entirely dispensed with and the nest converted into an ordinary nest by simply sliding the hinge leaf 34 until the same becomes disengaged from the attaching member 37. When so detached the false bottom 19 rests on the forward supports 120 as well as the rearward supports, the same occupying the position shown in full lines in Fig. 2. It will be noted that the door 31 and the bottom 19 are readily removed from the enclosure A by simply raising the same upwardly and sliding the same rearwardly through the opening 15 and the opening 18. It will be further noted that the door 31 is not fixedly connected to the nest proper so that such removal is readily accomplished. This permits of cleaning and inspecting the nest without appreciable effort or waste of time and at the same time allows the nest to be readily converted into the ordinary nest at any time, if desired.

Changes in the specific form of my invention, as herein disclosed, may be made within the scope of what is claimed without departing from the spirit of my invention.

Having described my invention, what I claim as new and desire to protect by Letters Patent is:

1. A trap nest comprising an enclosure having a wall formed with an entrance opening, a door for said opening adapted to normally extend outwardly beyond said wall to form an approach to said opening, a portion of said door extending across the sill of said opening and inwardly within said enclosure and adapted to rest thereon, a movable member within said enclosure, a stop formed on said door in proximity to the point of contact of said door with said sill for swingably mounting said door in conjunction therewith, and means connecting the inwardly extending portion of said door with said movable member for swinging said door into closing position upon downward movement of said member.

2. A trap nest comprising an enclosure having a wall formed with an entrance opening, a door for said opening adapted to normally extend outwardly beyond said wall to form an approach to said opening, a portion of said door extending across the sill of said opening and inwardly within said enclosure, a movable member within said enclosure, a stop formed on said door in proximity to the point of contact of said door with said wall for swingably mounting said door in conjunction therewith said wall forming a fulcrum on which said door swings, said movable member being hingedly connected with said member for swinging said door in closing position upon downward movement of said member.

3. A trap nest comprising an enclosure having a vertical wall formed with an entrance opening therein, a rest positioned outwardly beyond said vertical wall, a door for said opening adapted in its open position to be supported at one end upon said rest, another portion of said door being adapted to extend across the sill of said opening and to be supported thereby, said other portion resting freely on said sill, a stop on said door in proximity to the point of contact of said door with said sill for forming in conjunction with said other portion a hinge structure for swingably supporting said door relative to said opening said wall forming a fulcrum on which said door swings, and a member within said enclosure hingedly connected to said door for swinging said door into closing position.

4. A trap nest comprising an enclosure having a vertical wall formed with a circular entrance opening, a circular door for said wall adapted to normally extend outwardly therefrom in a substantially horizontal position, a rest for the outermost portion of said door, a portion of said door extending across the sill of said opening and into the interior of said enclosure, a hinge member connected to the inwardly extending portion of said door and a movable member within said enclosure hingedly connected to said hinge for swinging said door into closing position upon downward movement thereof, the edge of said circular opening serving as a fulcrum for swingably mounting said door and serving to center the door relative to said opening.

5. A trap nest comprising an enclosure having a vertical wall formed with a circular entrance opening, a circular door for said wall adapted to normally extend outwardly therefrom with a portion thereof extending across the sill of said opening and into the interior of said enclosure, said door resting upon the edge of said wall at said circular opening and being centered thereby and fulcrumed thereon, means within said nest for swinging said door upwardly and means formed on said door for holding said door fulcrumed upon the edge of said wall.

6. A trap nest comprising an enclosure having a vertical wall formed with an entrance opening, said opening having lower converging edges, a door for said wall adapted to normally extend outwardly therefrom with a portion of said door extending across the converging edges of said opening, said door being centered thereby and fulcrumed on said converging edges, means for depressing said door within said nest and means for holding said door in fulcrumed position upon said converging edges.

7. A trap nest comprising an enclosure having an opening, a movable bottom within said enclosure, a door for said opening swingably mounted relative to the sill of said enclosure, rests for said bottom at the rear end of said enclosure, said bottom being tiltably supported on said rests, said bottom being positioned below the level of the lowermost portion of said door, and a link pivoted to said door and connected to said bottom for operating said door.

In testimony whereof, I have signed my name to this specification.

JOHN L. SKINNER.